(12) United States Patent
Steenstra et al.

(10) Patent No.: US 8,391,480 B2
(45) Date of Patent: *Mar. 5, 2013

(54) DIGITAL AUTHENTICATION OVER ACOUSTIC CHANNEL

(75) Inventors: Jack Steenstra, San Diego, CA (US);
Alexander Gantman, Poway, CA (US);
John W. Noerenberg, II, San Diego, CA (US); Ahmad Jalali, Rancho Santa Fe, CA (US); Gregory Rose, Concord (AU)

(73) Assignee: QUALCOMM Incorporated, San Diego, CA (US)

( * ) Notice: Subject to any disclaimer, the term of this patent is extended or adjusted under 35 U.S.C. 154(b) by 439 days.

This patent is subject to a terminal disclaimer.

(21) Appl. No.: 12/365,126

(22) Filed: Feb. 3, 2009

(65) Prior Publication Data

US 2009/0141890 A1    Jun. 4, 2009

Related U.S. Application Data

(63) Continuation of application No. 10/785,313, filed on Feb. 23, 2004, now Pat. No. 7,487,362, which is a continuation-in-part of application No. 10/625,710, filed on Jul. 22, 2003, now Pat. No. 7,533,735, which is a continuation-in-part of application No.

(Continued)

(51) Int. Cl.
*H04L 9/00* (2006.01)

(52) U.S. Cl. .............. 380/44; 380/277; 726/26; 726/27; 713/168; 713/176; 713/182; 713/194

(58) Field of Classification Search .................. None
See application file for complete search history.

(56) References Cited

U.S. PATENT DOCUMENTS

| | | | |
|---|---|---|---|
| 4,305,143 A | 12/1981 | Simms et al. | |
| 4,601,011 A | 7/1986 | Grynberg | |
| 4,961,142 A | 10/1990 | Elliott et al. | |
| 5,196,840 A | 3/1993 | Leith et al. | |
| 5,200,993 A | 4/1993 | Wheeler | |
| 5,422,953 A | 6/1995 | Fischer | |

(Continued)

FOREIGN PATENT DOCUMENTS

| | | |
|---|---|---|
| CN | 1263324 | 9/2001 |
| EP | 0374012 A1 | 6/1990 |

(Continued)

OTHER PUBLICATIONS

OA mailed May 6, 2009 for Chilean Patent Application Serial No. 0283-2003, 4 pages.

(Continued)

*Primary Examiner* — Pramila Parthasarathy
(74) *Attorney, Agent, or Firm* — Won Tae Kim

(57) ABSTRACT

Apparatus and method are disclosed for digital authentication and verification. In one embodiment, authentication involves storing a cryptographic key and a look up table (LUT), generating an access code using the cryptographic key; generating multiple parallel BPSK symbols based upon the access code; converting the BPSK symbols into multiple tones encoded with the access code using the LUT; and outputting the multiple tones encoded with the access code for authentication. In another embodiment, verification involves receiving multiple tones encoded with an access code; generating multiple parallel BPSK symbols from the multiple tones; converting the BPSK symbols into an encoded interleaved bit stream of the access code; de-interleaving the encoded interleaved bit stream; and recovering the access code from the encoded de-interleaved bit stream.

18 Claims, 13 Drawing Sheets

Related U.S. Application Data

10/139,873, filed on May 6, 2002, now Pat. No. 7,966, 497, which is a continuation-in-part of application No. 10/077,365, filed on Feb. 15, 2002, now Pat. No. 7,251, 730.

(56) References Cited

U.S. PATENT DOCUMENTS

| | | |
|---|---|---|
| 5,481,611 A | 1/1996 | Owens et al. |
| 5,561,710 A | 10/1996 | Helms |
| 5,623,637 A | 4/1997 | Jones et al. |
| 5,696,879 A | 12/1997 | Cline et al. |
| 5,745,555 A | 4/1998 | Mark |
| 5,757,918 A | 5/1998 | Hopkins |
| 5,784,464 A | 7/1998 | Akiyama et al. |
| 5,802,176 A | 9/1998 | Audebert |
| 5,953,700 A | 9/1999 | Kanevsky et al. |
| 5,983,347 A | 11/1999 | Brinkmeyer et al. |
| 6,018,739 A | 1/2000 | McCoy et al. |
| 6,023,676 A | 2/2000 | Erell |
| 6,084,967 A | 7/2000 | Kennedy et al. |
| 6,130,859 A | 10/2000 | Sonnenschein et al. |
| 6,157,820 A * | 12/2000 | Sourour et al. ............ 455/226.2 |
| 6,188,717 B1 | 2/2001 | Kaiser et al. |
| 6,213,391 B1 | 4/2001 | Lewis |
| 6,216,231 B1 | 4/2001 | Stubblebine |
| 6,236,724 B1 | 5/2001 | Labaton |
| 6,272,176 B1 | 8/2001 | Srinivasan |
| 6,275,934 B1 | 8/2001 | Novicov et al. |
| 6,282,522 B1 | 8/2001 | Davis et al. |
| 6,297,795 B1 | 10/2001 | Kato et al. |
| 6,327,314 B1 | 12/2001 | Cimini et al. |
| 6,343,049 B1 | 1/2002 | Toda |
| 6,389,055 B1 | 5/2002 | August et al. |
| 6,397,368 B1 | 5/2002 | Yonge et al. |
| 6,408,388 B1 | 6/2002 | Fischer |
| 6,460,138 B1 | 10/2002 | Morris |
| 6,463,537 B1 | 10/2002 | Tello |
| 6,505,160 B1 | 1/2003 | Levy et al. |
| 6,553,494 B1 | 4/2003 | Glass |
| 6,594,705 B1 | 7/2003 | Philyaw |
| 6,607,136 B1 | 8/2003 | Atsmon et al. |
| 6,615,171 B1 | 9/2003 | Kanevsky et al. |
| 6,768,778 B1 | 7/2004 | Chen et al. |
| 6,778,828 B1 | 8/2004 | Chander et al. |
| 6,889,209 B1 | 5/2005 | Rabin et al. |
| 7,093,131 B1 | 8/2006 | Kobayashi |
| 7,146,500 B2 | 12/2006 | Hawkins et al. |
| 7,349,481 B2 | 3/2008 | Steentra et al. |
| 7,401,224 B2 | 7/2008 | Gantman et al. |
| 7,433,452 B2 | 10/2008 | Taylor et al. |
| 7,487,362 B2 | 2/2009 | Steenstra et al. |
| 7,533,735 B2 | 5/2009 | Gantman et al. |
| 7,966,497 B2 | 6/2011 | Gantman et al. |
| 2001/0021980 A1 | 9/2001 | Linden et al. |
| 2001/0039619 A1 | 11/2001 | Lapere et al. |
| 2001/0055352 A1 | 12/2001 | Bannasch et al. |
| 2002/0095587 A1 | 7/2002 | Doyle et al. |
| 2002/0114270 A1 | 8/2002 | Pierzga et al. |
| 2002/0122465 A1 | 9/2002 | Agee et al. |
| 2002/0141575 A1 | 10/2002 | Hird |
| 2002/0154772 A1 | 10/2002 | Morishita et al. |
| 2002/0184526 A1 | 12/2002 | Bender et al. |
| 2002/0191765 A1 | 12/2002 | Labaton |
| 2003/0026197 A1 | 2/2003 | Crawford |
| 2003/0028770 A1 | 2/2003 | Litwin |
| 2003/0055892 A1 | 3/2003 | Huitema et al. |
| 2003/0120925 A1 | 6/2003 | Rose et al. |
| 2003/0212549 A1 | 11/2003 | Steentra et al. |
| 2005/0047514 A1 | 3/2005 | Bolinth et al. |
| 2005/0228720 A1 | 10/2005 | Pavlic et al. |
| 2005/0229009 A1 | 10/2005 | Fujii et al. |
| 2009/0044015 A1 | 2/2009 | Gantman et al. |
| 2011/0191253 A1 | 8/2011 | Pilskalns |
| 2011/0270764 A1 | 11/2011 | Mizani Oskui |

FOREIGN PATENT DOCUMENTS

| | | |
|---|---|---|
| EP | 1211836 A1 | 6/2002 |
| FR | 2753860 A1 | 3/1998 |
| GB | 2360618 A | 9/2001 |
| JP | 3214834 A | 9/1991 |
| JP | 7254897 | 3/1995 |
| JP | 9502038 A | 2/1997 |
| JP | 10134157 A | 5/1998 |
| JP | 11-289324 | 10/1999 |
| JP | 11316740 A | 11/1999 |
| JP | 2000508099 A | 6/2000 |
| JP | 2000-224156 | 8/2000 |
| JP | 2000235340 A | 8/2000 |
| JP | 2000284689 A | 10/2000 |
| JP | 2001-7802 | 1/2001 |
| JP | 2001203688 A | 7/2001 |
| JP | 2001-265217 | 9/2001 |
| JP | 2001-309159 | 11/2001 |
| JP | 2003-500957 A | 1/2003 |
| JP | 2005-518721 A | 6/2005 |
| JP | 2006-528391 A | 12/2006 |
| JP | 4680505 | 5/2011 |
| WO | WO9506371 A1 | 3/1995 |
| WO | WO 9724857 B2 | 7/1997 |
| WO | 97/31437 | 8/1997 |
| WO | WO9736264 A1 | 10/1997 |
| WO | 98/13971 | 4/1998 |
| WO | 9825220 | 6/1998 |
| WO | WO9929058 A1 | 6/1999 |
| WO | 00/21020 | 4/2000 |
| WO | 01/11575 | 2/2001 |
| WO | WO 0110071 A1 | 2/2001 |
| WO | 0106140 | 8/2001 |
| WO | 0158080 | 8/2001 |
| WO | WO0161640 A1 | 8/2001 |
| WO | WO0171590 A1 | 9/2001 |
| WO | 02/05078 | 1/2002 |
| WO | 02/50078 | 1/2002 |
| WO | 02/13455 | 2/2002 |
| WO | WO0217530 A1 | 2/2002 |
| WO | WO 0219590 A2 | 3/2002 |
| WO | WO2011112158 A1 | 9/2011 |

OTHER PUBLICATIONS

OA dated Aug. 14, 2009 for Chinese Patent Application Serial No. 02828136.5, 3 pages.
OA dated Oct. 15, 2009 for Chinese Patent Application Serial No. 03807031.6, 11 pages.
OA dated Aug. 21, 2009 for European Patent Application Serial No. 03742418.1, 4 pages.
OA dated Jun. 23, 2009 for European Patent Application Serial No. 03742418.1, 5 pages.
OA dated Nov. 4, 2009 for European Patent Application Serial No. 02798566.2, 26 pages.
OA dated Jul. 22, 2009 for European Patent Application Serial No. 02798566.2, 8 pages.
OA dated May 1, 2009 for Indian Patent Application Serial No. 1801/CHENP/2004-KM, 2 pages.
OA mailed Apr. 2, 2009 for Japanese Patent Application Serial No. 2003-557137, 9 pages.
OA mailed Jun. 16, 2009 for Japanese Patent Application Serial No. 2003-570546, 5 pages.
OA dated Sep. 30, 2009 for Korean Patent Application Serial No. 10-2004-7009836, 3 pages.
Chinese OA dated Jan. 10, 2011 for CN Patent Application No. 200480021026.9, 7 pages.
Korean OA dated Jan. 18, 2011 for KR Patent Application No. 2006-7001477, 3 pages.
European OA dated Sep. 21, 2006 for EP Patent Application No. 03 716 025.6-2221, 6 pages.
OA dated May 28, 2009 for U.S. Appl. No. 10/139,873, 39 pages.
OA dated Oct. 28, 2009 for U.S. Appl. No. 10/139,873, 49 pages.
OA dated Dec. 10, 2008 for U.S. Appl. No. 10/139,873, 10 pages.
OA mailed May 1, 2009 for CN Patent Application Serial No. 02828136.5, 8 pages.

Australian OA dated Jun. 17, 2010 for AU Patent Application No. 2004262288, 3 pages.
Australian OA dated May 14, 2009 for AU Patent Application No. 2004262288, 2 pages.
OA dated Jun. 3, 2010 for Canadian Patent Application Serial No. 2476485, 3 pages.
OA dated Jul. 16, 2010 for Colombian Patent Application Serial No. 04090727, 2 pages.
OA dated Aug. 19, 2010 for U.S. Appl. No. 10/139,873, 38 pages.
Gerasimov, et al., Things that talk: Using sound . . . /IBM Systems Journal, vol. 39, Nos. 384, 2000, 17 pages.
European Search Report dated Jun. 6, 2006 for EP Application Serial No. 02798566, 6 pages.
International Search Report dated Apr. 10, 2003 for PCT Application Serial No. PCT/US02/40972, 1 page.
European Search Report dated Sep. 22, 2005 for EP Application Serial No. 03742418.1, 3 pages.
Miyoshi, Preliminary Design of OFDM and CDMA . . . /IEEE Explore Jan. 23, 2009, 4 pages.
International Search Report dated Sep. 5, 2003 for PCT Application Serial No. PCT/US03/20921, 2 pages.
OA mailed Apr. 29, 2008 for CN Patent Application Serial No. 02828136.5, 8 pages.
OA mailed Sep. 19, 2008 for CN Patent Application Serial No. 02828136.5, 7 pages.
OA mailed Jan. 9, 2009 for CN Patent Application Serial No. 02828136.5, 3 pages.
OA mailed Dec. 24, 2007 for SG Patent Application Serial No. 200600213-3, 5 pages.
OA mailed Feb. 18, 2009 for EP Patent Application Serial No. 03742418.1, 6 pages.
OA mailed Apr. 16, 2007 for AU Patent Application Serial No. 2003219752, 1 page.
European Search Report dated Sep. 22, 2005 for EP Application Serial No. 03742418.1, 2 pages.
OA mailed Nov. 9, 2007 for CN Patent Application Serial No. 03807031.6, 4 pages.
OA mailed Jul. 11, 2008 for CN Patent Application Serial No. 03807031.6, 3 pages.
OA mailed Jan. 9, 2009 for CN Patent Application Serial No. 03807031.6, 10 pages.
OA mailed May 20, 2009 for EP Patent Application Serial No. 03716025.6, 7 pages.
OA mailed Jul. 1, 2009 for IL Patent Application Serial No. 163527, 4 pages.
OA mailed May 1, 2009 for IN Patent Application Serial No. 1801/CHENP/2004, 2 pages.
OA mailed Apr. 6, 2008 for IN Patent Application Serial No. 244/CHENP/2006, 2 pages.
OA mailed Jul. 10, 2009 for CN Patent Application Serial No. 200480021026.9, 10 pages.
OA mailed Jun. 23, 2008 for MX Patent Application Serial No. PA/a/2006/000801, 2 pages.
Japanese OA dated Aug. 10, 2010 for JP Patent Application No. 2006-521236, 3 pages.
Chilean Office Action mailed Sep. 3, 2010 for CL Application Serial No. 0283-03, 6 pages.
International Search Report and Written Opinion—PCT/US2004/023580—International Search Authority, European Patent Office, Apr. 2, 2007.
OA dated Jan. 9, 2009 from Chinese Application Serial No. 03807031.6, 17 pages.
Supplementary European Search Report—EP04786093—Search Authority—Munich—Sep. 14, 2011.
Imai, "Java Network Programming [Security Version], Let's Make a Secret Bulletin Board,"Software Design, No. 134, Japan, Gijitsu-HyohronCo., Ltd., 2001, Dec. pp. 26-37.
European Search Report dated Sep. 21, 2011, for EP Application Serial No. 04786093.7-2415/1654688, 3 pages.

* cited by examiner

FIG. 5A

| 0 | 1 | 1 | 1 | 0 | 0 | 1 | 0 |

BPSK SYMBOLS

FIG. 5B

| 0101 | 1111 | 0000 | 1010 |

REPEATED BPSK SYMBOLS

FIG. 5C

| T1<br>000 | T2<br>0001 | T3<br>0010 | T4<br>0011 |
|---|---|---|---|
| T5<br>0100 | T6<br>0101 | T7<br>0110 | T8<br>0111 |
| T9<br>1000 | T10<br>1001 | T11<br>1010 | T12<br>1011 |
| T13<br>1100 | T14<br>1101 | T15<br>1110 | T16<br>1111 |

LUT

FIG. 7A  | $A_1 B_1 A_2 B_2$ | $C_1 D_1 C_2 D_2$ |

ORIGINAL REPEATED
SETS OF BPSK SYMBOLS

FIG. 7B  | $A'_1 B'_1 A'_2 B'_2$ | $C'_1 D'_1 C'_2 D'_2$ |

DEMODULATED REPEATED
SETS OF BPSK SYMBOLS

FIG. 7C  | $A'_1 B'_1$ | $C'_2 D_2$ |

EXAMPLE SELECTED SET

FIG. 7D  | $A'_1 B'_2$ | $C'_2 D'_1$ |

EXAMPLE SELECTED SET

DIGITAL AUTHENTICATION OVER ACOUSTIC CHANNEL

CROSS-REFERENCE TO RELATED APPLICATIONS

This application is a continuation of U.S. application Ser. No. 10/785,313 filed Feb. 23, 2004, entitled "Digital Authentication Over Acoustic Channel," which is a continuation-in-part of U.S. application Ser. No. 10/625,710 filed Jul. 22, 2003, entitled "Digital Authentication Over Acoustic Channel," which is a continuation-in-part of U.S. application Ser. No. 10/139,873 filed May 6, 2002, entitled "System and Method for Acoustic Two Factor Authentication," which is a continuation-in-part of U.S. application Ser. No. 10/077,365 filed Feb. 15, 2002, entitled "Method and Apparatus for Simplified Audio Authentication," all of which are assigned to the same assignee and herein incorporated by reference.

This application is also related to the following, all of which are assigned to the same assignee of this application: co-pending U.S. application Ser. No. 09/611,569 filed Jul. 7, 2000, entitled "Method and Apparatus for Secure Identity Authentication With Audible Tones"; co-pending U.S. application Ser. No. 10/356,144 filed Jan. 30, 2003, entitled "Wireless Communication Using Sound"; and co-pending U.S. application Ser. No. 10/356,425 filed Jan. 30, 2003, entitled "Communication Using Audible Tones."

BACKGROUND

1. Field of Invention

The invention generally relates to authentication, and more particularly to digital authorization of entities using sound.

2. Description of the Related Art

With the growth of electronic commerce, use of public communication infrastructure, such as the Internet, to access various secure networks, systems and/or applications has also grown. For example, users may gain access to banks (online or by automatic teller machines (ATM)), a private network such as an intranet, a secure server or database, and/or other virtual private network (VPN) over a public communication infrastructure by digital authentication.

However, with the introduction of a system of communication wherein face-to-face contact is not possible, opportunities for fraudulent or unauthorized access have increased. Misappropriated identity in the hands of wrongdoers may cause damage to individuals, organizations or other entities.

To prevent unauthorized access, various security schemes have been developed to verify user or entity identification such that only authorized entities are given access. One technique for user authentication and access control can be implemented by a access code generating device, such as a token. Here, a unique access code is periodically generated displayed to a user. Typically, the access code is generated from an algorithm that is based on a secure information and the current time. The user is then required to input the currently displayed access code to gain access.

In some systems, a password is also required to gain access. These types of systems are known as the two-factor authentication. Two-factor authentication is typically based on something that a user has, for example the token, and something that a user knows, such as the password. Because both pieces of information are used to authenticate a user, systems implementing the two-factor authentication may be less susceptible to attacks than a single-factor authentication.

While a token as described above may prevent unauthorized access, it is cumbersome because users must manually enter each access code during each access. Also, errors are more likely to occur due to the manual input of the access code. In some systems, a user is required to input the access code more than once during each access, which increases the inconvenience and possibility of errors. Furthermore, because the access code may be based on time and is continuously displayed, a constant computation may be required by the token, thereby shortening the battery life of the token.

Therefore, there is a need for a more efficient, more convenient and/or more secure way to implement a control access system using a device.

SUMMARY

Embodiments disclosed herein address the above stated needs by providing a method for security in a data processing system.

In one aspect, an apparatus for use in authentication comprises a storage medium configured to store a cryptographic key and a look up table (LUT); a first processor coupled to the storage medium, configured to generate an access code using the cryptographic key; a converter coupled to the processor, configured to convert the access code into multiple tones encoded with the access code; and an audio output unit configured to output the multiple tones encoded with the access code for authentication; wherein the converter may comprise a binary phase shift keying (BPSK) module configured to generate multiple parallel BPSK symbols, and a second processor coupled to the BPSK module and the storage medium, configured to convert the BPSK symbols into the multiple tones using the LUT. Here, either one of the first or second processor may be configured to repeat the BPSK symbols a selected number of time; and the second processor may then convert repeated BPSK symbols into the multiple tones.

In another embodiment, an apparatus for use in authentication may comprise a storage medium configured to store a cryptographic key and a look up table (LUT); a processor coupled to the storage medium, configured to generate an access code using the cryptographic key; a converter coupled to the processor, configured to convert the access code into multiple tones encoded with the access code; and an audio output unit configured to output the multiple tones encoded with the access code for authentication; wherein the converter may comprise a binary phase shift keying (BPSK) module configured to generate multiple parallel BPSK symbols; and wherein the processor is configured to convert the BPSK symbols into multiple tones using the LUT.

In still another embodiment, a method for use in authentication may comprise storing a cryptographic key and a look up table (LUT); generating an access code using the cryptographic key; generating multiple parallel BPSK symbols based upon the access code; converting the BPSK symbols into multiple tones encoded with the access code using the LUT; and outputting the multiple tones encoded with the access code for authentication. The method may further comprise repeating the BPSK symbols a selected number of times before converting the BPSK symbols. Here, repeating the BPSK symbols may comprise repeating a set of three BPSK symbols the selected number of times; and converting the BPSK symbols may comprise converting each set of three BPSK symbols into the multiple tones using the LUT.

In a further embodiment, an apparatus for use in authentication may comprise means for storing a cryptographic key and a look up table (LUT); means for generating an access code using the cryptographic key; means for generating multiple parallel BPSK symbols based upon the access code; means for converting the BPSK symbols into multiple tones encoded with the access code using the LUT; and means for outputting the multiple tones encoded with the access code for authentication. The apparatus may further comprise means for repeating the BPSK symbols a selected number of times; wherein the means for converting the BPSK converts the repeated BPSK symbols.

In still a further embodiment, an apparatus for use in authentication may comprise a storage medium configured to store a cryptographic key; a processor coupled to the storage medium, configured to generate an access code using the cryptographic key; a converter coupled to the processor, configured to convert the access code into multiple tones encoded with the access code; and an audio output unit coupled to the converter, configured to output the multiple tones encoded with the access code for authentication; wherein the converter may comprise a binary phase shift keying (BPSK) module configured to generate multiple parallel repeated BPSK symbols based on the access code; an inverse fast fourier transform (IFFT) module coupled to the BPSK module, configured to perform IFFT on the repeated BPSK symbols to generate code symbols; and an up-converter coupled to the IFFT module, configured to modulate the code symbols into the multiple tones encoded with the access code.

In yet another embodiment, a method for use in authentication may comprise storing a cryptographic key; generating an access code using the cryptographic key; generating multiple parallel binary phase shift keying (BPSK) symbols based upon the access code; repeating the BPSK symbols a selected number of times before converting the BPSK symbols; performing inverse fast fourier transform (IFFT) on the repeated BPSK symbols to generate IFFT symbols; modulating the IFFT symbols into the multiple tones encoded with the access code; and outputting the multiple tones encoded with the access code for authentication.

In yet another embodiment, an apparatus for use in authentication comprises means for storing a cryptographic key; means for generating an access code using the cryptographic key; means for generating multiple parallel binary phase shift keying (BPSK) symbols based upon the access code; means for repeating the BPSK symbols a selected number of times before converting the BPSK symbols; means for performing inverse fast fourier transform (IFFT) on the repeated BPSK symbols to generate IFFT symbols; means for modulating the IFFT symbols into the multiple tones encoded with the access code; and means for outputting the multiple tones encoded with the access code for authentication.

Yet in a further embodiment, an apparatus for use in verification may comprise an audio input unit configured to receive multiple tones encoded with an access code; a converter coupled to the audio input unit, configured to recover the access code from the multiple tones encoded with the access code; and wherein the converter may comprises a down-converter configured to demodulate the multiple tones into IFFT symbols; a fast fourier transform (FFT) module configured to generate multiple parallel BPSK symbols from the IFFT symbols; a BPSK module coupled to the processor, configured to convert the BPSK symbols into an encoded interleaved bit stream of the access code; a de-interleaver coupled to the BPSK module, configured to de-interleave the encoded interleaved bit stream; and a decoding module coupled to the de-interleaver, configured to recover the access code from the encoded de-interleaved bit stream. The apparatus may further comprise a storage medium configured to store a cryptographic key; and a processor coupled to the storage medium and the converter, configured to verify the access code using the cryptographic key and to grant access if the access code is verified. Also, the FFT module may convert the multiple tones into repeated sets of BPSK symbols and generate a selected set of BPSK symbols; wherein the BPSK module converts the selected set of BPSK symbols.

In still another embodiment, a method for use in verification may comprise receiving multiple tones encoded with an access code; generating multiple parallel BPSK symbols from the multiple tones; converting the BPSK symbols into an encoded interleaved bit stream of the access code; de-interleaving the encoded interleaved bit stream; and recovering the access code from the encoded de-interleaved bit stream. Here, performing FFT may comprise generating repeated BPSK symbols; wherein the method further comprises generating a selected set of BPSK symbols from the repeated BPSK symbols; and wherein performing the BPSK comprises converting the selected set of BPSK symbols into the encoded interleaved bit stream.

Also, performing the FTT may comprise converting the IFFT symbols into repeated sets of three BPSK symbols; wherein generating the selected set of BPSK symbols comprises selecting three BPSK symbols from the repeated sets of three BPSK symbols to generate the selected set of BPSK symbols. Alternatively, performing the FFT may comprise converting the IFFT symbols into repeated sets of three BPSK symbols; wherein generating the selected set of BPSK symbols comprises selecting one of the repeated sets of three BPSK symbols to generate the selected set of BPSK symbols.

In still yet another embodiment, an apparatus for use in verification may comprise means for receiving multiple tones encoded with an access code; means for demodulating the multiple tones into inverse fast fourier transform (IFFT) symbols; means for performing fast fourier transform (FFT) to generate repeated BPSK symbols from the IFFT symbols; means for generating a selected set of BPSK symbols from the repeated BPSK symbols; means for converting the selected set of BPSK symbols into an encoded interleaved bit stream of the access code; means for de-interleaving the encoded interleaved bit stream; and means for recovering the access code from the encoded de-interleaved bit stream.

BRIEF DESCRIPTIONS OF THE DRAWINGS

Various embodiments will be described in detail with reference to the following drawings in which like reference numerals refer to like elements, wherein:

FIGS. 5A and 5B show examples of BPSK symbols;

FIG. 5C shows an example of a LUT;

FIGS. 7A and 7B show examples of an original repeated sets of BPSK symbols and a recovered repeated sets of BPSK symbols;

FIGS. 7C and 7D show examples of selected set of BPSK symbols;

DETAILED DESCRIPTION

Generally, embodiments disclosed use the acoustic channel for digital authentication of a user or entity. In the following description, specific details are given to provide a thorough understanding of the embodiments. However, it will be understood by one of ordinary skill in the art that the embodiments may be practiced without these specific detail. For example, circuits may be shown in block diagrams in order not to obscure the embodiments in unnecessary details. In other instances, well-known circuits, structures and techniques may be shown in detail in order to better explain the embodiments.

Also, it is noted that the embodiments may be described as a process which is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, as disclosed herein, the term "sound wave" refers to acoustic wave or pressure waves or vibrations traveling through gas, liquid or solid. Sound waves include ultrasonic, audio and infrasonic waves. The term "audio wave" refers to sound wave frequencies lying within the audible spectrum, which is approximately 20 Hz to 20 kHz. The term "ultrasonic wave" refers to sound wave frequencies lying above the audible spectrum and the term "infrasonic wave" refers to sound wave frequencies lying below the audible spectrum. The term "storage medium" represents one or more devices for storing data, including read only memory (ROM), random access memory (RAM), magnetic disk storage mediums, optical storage mediums, flash memory devices and/or other machine readable mediums for storing information. The term "machine readable medium" includes, but is not limited to portable or fixed storage devices, optical storage devices, wireless channels and various other devices capable of storing, containing or carrying codes and/or data. The term "tone" refers to a sound wave carrier signal of certain pitch and vibration that carry digital data. The term "multiple tones" refers to three or more tones. The term "authentication" refers to verification of an identity, and the terms authentication and verification will be used interchangeably.

Figure 1:
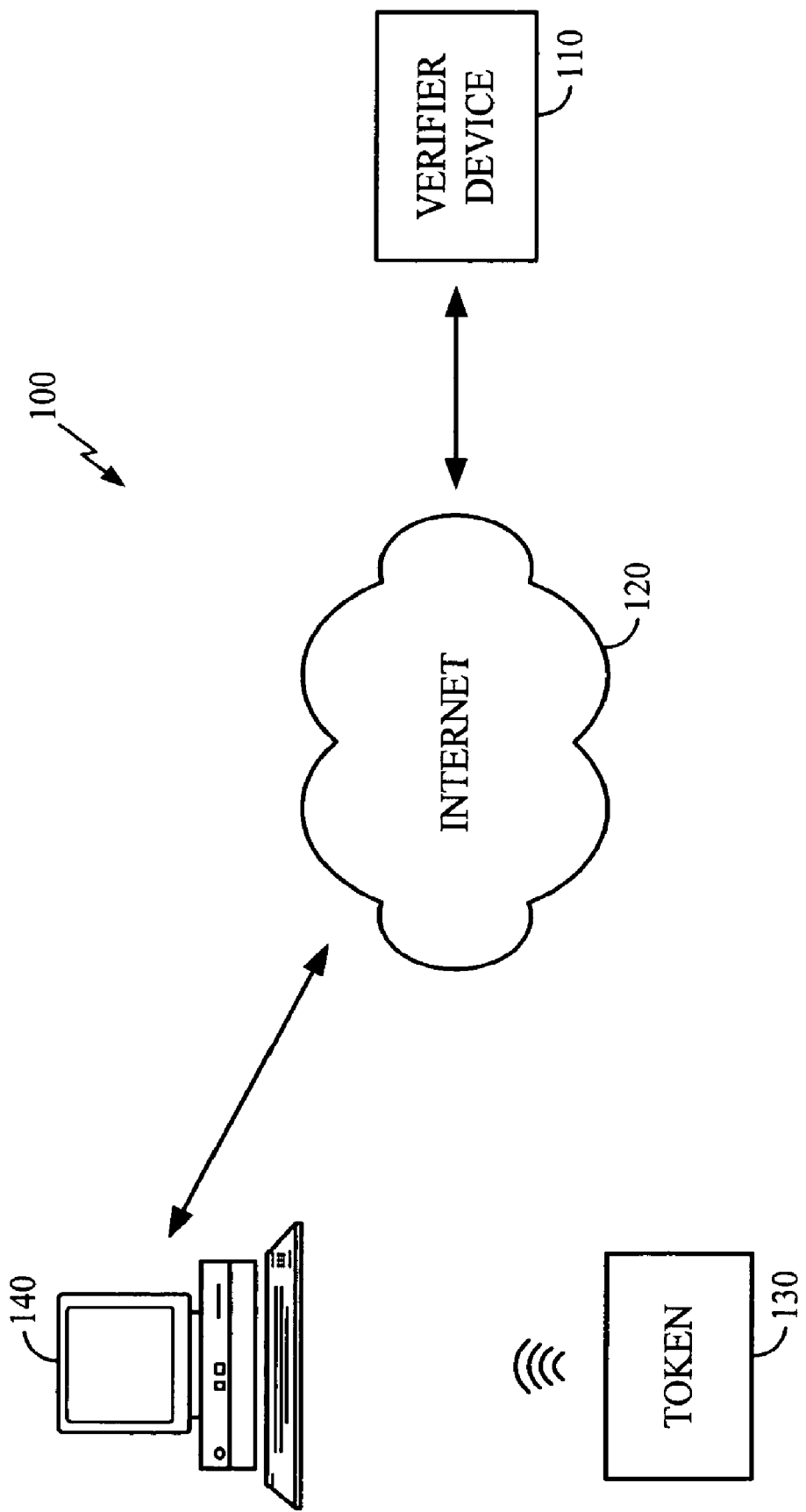
FIG. 1 shows a system for digital authentication over an acoustic channel.

FIG. 1 shows an example system 100 for digital authentication over an acoustic channel. In system 100, a verifier device 110 controls access to a secure network, system and/or application over a public communication infrastructure such as the Internet 120. Although access may be gained through a public communication infrastructure other than Internet 120, for purposes of explanation, system 100 will be described with reference to Internet 120.

To gain access over Internet 120, a device such as a token 130 provides an access code to verifier device 110 through a wireless communication device (WCD) 140. The access code is communicated from token 130 to WCD 140 through an acoustic channel. The access code is generated using a cryptographic key that is securely stored within token 130 and is encoded into sound waves for communication. More particularly, multi-carrier modulation is used to encode the generated access code into multiple tones and corresponding multi-carrier demodulation is used to recover the access code from the multiple tones.

User of token 130 may also provide a user information such as a username to verifier device 110. Here, the user information may be encoded into sound waves and communicated along with the access code to WCD 140. Alternatively, the user information may be entered directly into WCD 140. WCD 140 may then forward the access code and user information to verifier device 110 over Internet 120 for authentication. In still another alternative embodiment, the user information may be an assigned identification number of token 130. Thus, a user need not input the user information. The identification number is encoded automatically into sound waves along with the access code and communicated to WCD 140. Once access is granted, WCD 140 may be used to communicate with the secure network or system.

To forward the access code and/or user information, WCD 140 may recover the access code and/or user information, if encoded, from the sound waves. WCD 140 may then forward the access code and/or user information to verifier device 110. Alternatively, the sound waves encoded the access code and the sound waves encoded with the user information, if encoded, may be transmitted to verifier device 110. The access code and/or user information may then be recovered from the sound waves by verifier device 110. Here, the access code and user information, or the sound waves encoded with the access code and/or user information, may be transmitted using any known communication technology that allows access to Internet 120 in system 100.

Token 130 is typically a portable device that may be small enough to be carried inpockets and/or attached to a key chain. Physical possession of token 130 provides an aspect of the required verification, in the same manner that the physical possession of a key allows an individual to gain access through a locked door. Therefore, token 130 serves as an authentication tool and, other than communication by sound waves, token 130 need not have the conventional wireless communication capabilities to directly transmit an access code to verifier device 110 over Internet 120 or over other wireless and non-wireless infrastructures. Namely, in some embodiments, token 130 does not support wireless telecommunication capabilities; and does not include a wireless modem, network card and/or other wireless links to a private or public communication infrastructure such as Internet 120. As a result, the access code is transmitted over Internet 120 by WCD 140. It is to be noted, however, that in alternative embodiments, token 130 may be embedded into another device such as a wireless phone or a personal data assistant. Also, although WCD 140 is shown as a personal desktop computer, it may be various other computing devices such as but is not limited to laptop computer, PDAs, wireless phones or security devices of homes, offices or vehicles.

The access code is generated using a cryptographic key that is securely stored within token 130. The cryptographic key may be placed into token 130 at manufacture and is not known by the user. Here, two types of cryptographic keys may be used for digital authentication, symmetric cryptographic system and asymmetric cryptographic system. In symmetric cryptographic system, the secret key or symmetric key that is kept secret within token 130 is shared and placed in verifier device 110. Token 130 generates a digital signature using a secret key and the digital signature is sent to verifier device 110 for authentication. Verifier device 110 verifies the digital signature based the same secret key. In asymmetric cryptographic system, a private key and a public key are generated for a user. The public key is shared with verifier device 110 while the private key is kept secret within token 130. A digital signature is generated using the private key and sent to verifier device 110. Verifier device 110 then verifies the digital signature based on the user's public key.

In the above description, verifier device 110 identifies the cryptographic key that corresponds to a user based on the user information sent with the access code. Also, verifier device 110 may be implemented as part of the secure network or system into which a user wants access. Alternatively, verifier device 110 may be located externally from the secure network or system. Moreover, although FIG. 1 show one verifier device 110, it would be apparent to those skilled in the art that there may be more than one verifier device, each controlling access to one or more networks/systems.

Figure 2:
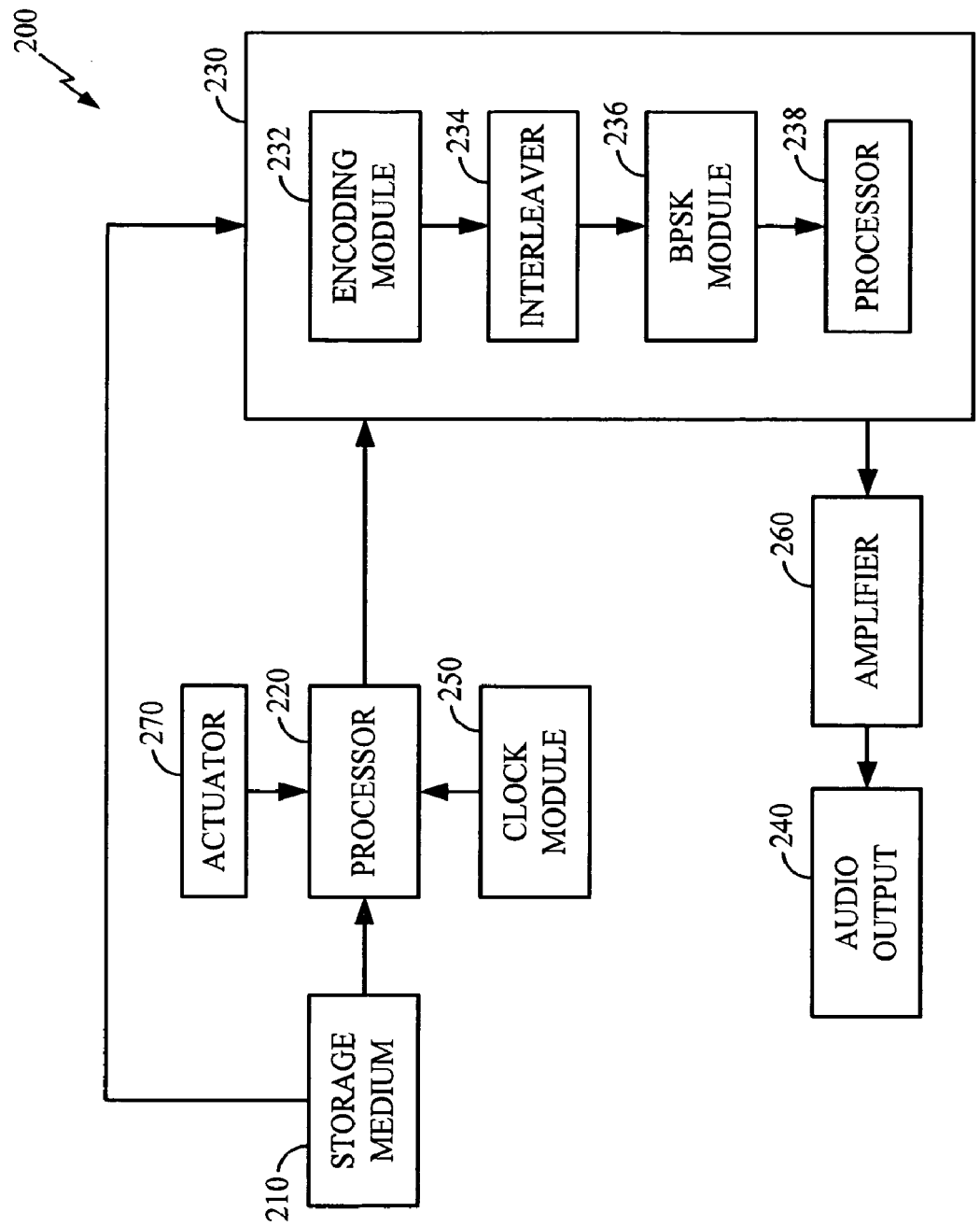
FIG. 2 shows an example embodiment of a token.
Figure 3:
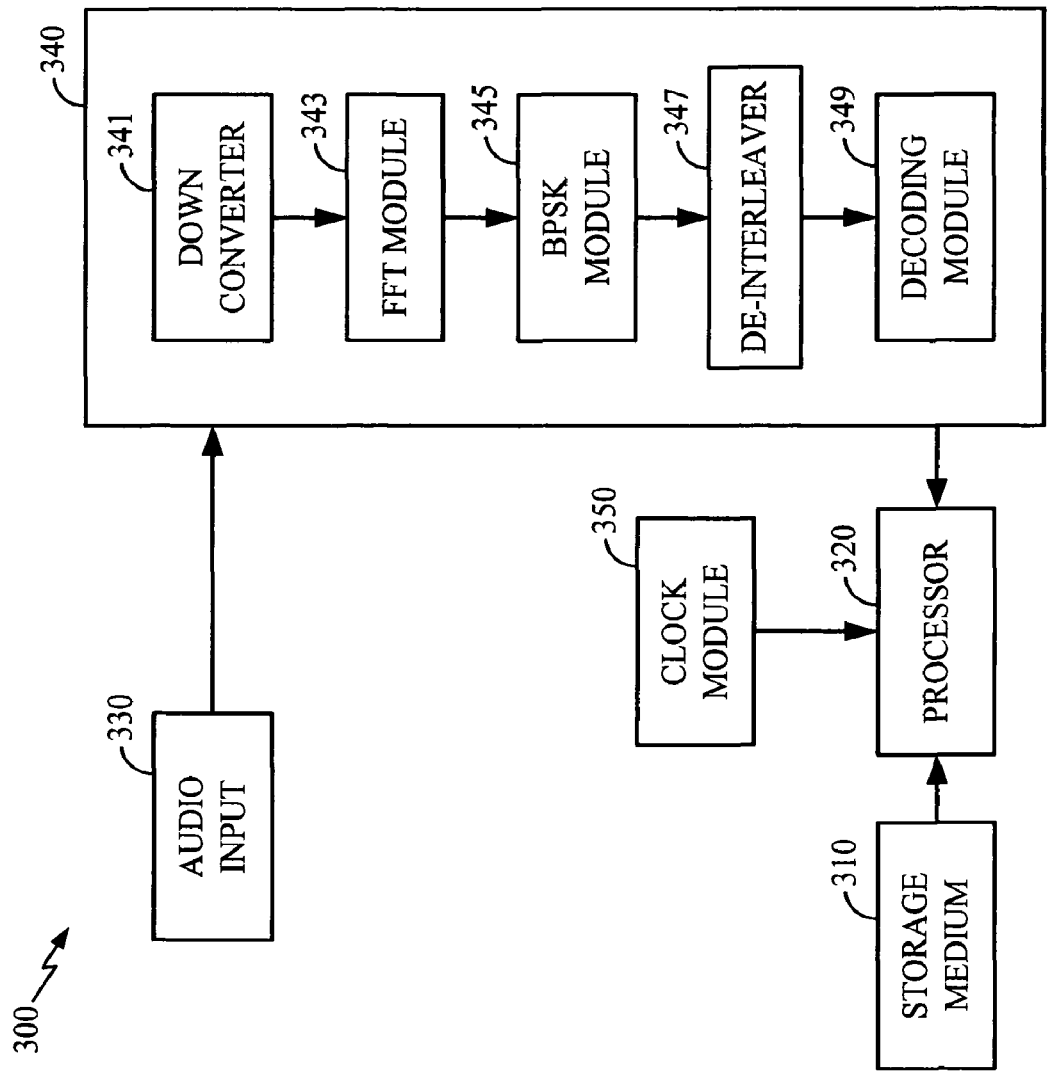
FIG. 3 shows an example embodiment of a verifier.

FIG. 2 shows a block diagram of an example embodiment of a token 200 and FIG. 3 shows an example embodiment of a corresponding verifier device 300. Token 200 may comprise a storage medium 210 configured to store a cryptographic key and a Look-up Table (LUT), a processor 220 configured to generate an access code using the cryptographic key, a converter 230 configured to convert the access code into multiple tones encoded with the access code using the LUT, and an audio output unit 240 configured to output the multiple tones encoded with the access code for verification. Verifier device 300 may comprise a storage medium 310 configured to store a cryptographic key, a processor 320 configured to generate an access code using the cryptographic key, an audio input unit 330 configured to receive multiple tones encoded with an access code from a token, and a converter 340 configured to recover the access code from the multiple tones. Based on the cryptographic key, processor 320 authenticates the access code of the user.

More particularly, an access code is converted to and from multiple tones based on multi-carrier modulation. Therefore, converter 230 modulates the access code into multi-carrier signals and converter 340 demodulates the access code from multi-carrier signals using a multi-carrier system. A multi-carrier system is described in co-pending U.S. application Ser. No. 10/356,144 and co-pending U.S. application Ser. No. 10/356,425. In multi-carrier modulation, data stream to be transmitted is divided into multiple interleaved bit streams. This results in multiple parallel bit streams having a much lower bit rate. Each bit stream is then used to modulate multiple carriers and transmitted over separate carrier signals. Typically, multi-carrier modulation involves encoding, interleaving, digital modulating, Inverse Fast Fourier Transform (IFFT) processing and up-converting the data stream to be transmitted. Demodulation involves down-converting, FTT processing, digital demodulating, de-interleaving and decoding the received data stream. In converters 230 and 340, however, the LUT is used to facilitate modulation as described below.

Converter 230 of token 200 may comprise an encoding module 232, an interleaver 234, a binary phase shift keying (BPSK) module 236 and a processor 238. Converter 340 of verifier device 300 may comprise a down converter 341, a FFT module 343, a BPSK module 345, a de-interleaver 347 and a decoding module 349. BPSK is a known technique of digital modulation that is simple to implement. Although BPSK does not result in the most efficient use of an available bandwidth, it is less susceptible to noise. Therefore, BPSK is used for converting the code symbols into tones. However, modulation techniques other than BPSK may be implemented in converters 230 and 340. Also, it should be noted that converter 230 shows a simplified multi-carrier modulator based on BPSK. A more typical commercial multi-carrier modulator may have additional components such as a preamble generator, a serial to parallel (S/P) converter or parallel to serial (P/S) converter. Similarly, converter 340 shows a simplified multi-carrier demodulator corresponding to converter 230, and a more typical commercial multi-carrier demodulator may also have additional components such as a synchronization unit, a S/P converter and a P/S converter.

Generally, encoding module 232 is configured to encode the bit stream or bit stream of the access code. The encoded bit stream are then interleaved into interleaved bit streams or code symbols by interleaver 234. BPSK module 236 is configured to generate multiple parallel BPSK symbols from the code symbols. More particularly, the encoded bit stream are converted from serial to parallel into parallel code symbols. The parallel code symbols are then mapped by BPSK module 236 into multiple parallel BPSK symbols. Here, the code symbols may be mapped into BPSK symbols and then converted from serial to parallel BPSK symbols, or the code symbols may be converted from serial to parallel and then mapped into BPSK symbols. Also, the number of BPSK symbols correspond to the number of tones available in the multi-carrier system. In some embodiments, the multi-carrier tones have frequencies in the range from about 1 kHz to 3 kHz and the bandwidth allowed for each carrier would depend on the number of tones. For example, if the number of available tones is 64, a bandwidth of about 31.25 Hz would be allowed for each carrier. The multiple BPSK symbols generated as described above are converted into multiple tones using the LUT and converted from parallel to serial by processor 238. By implementing the LUT, BPSK symbols may directly be converted into multiple tones without IFFT processing and up-conversion. Detail operations of the LUT will be described below with reference to FIG. 5.

To recover the access code, converter 340 would perform a process that is inverse to the process performed by converter 230. Namely, down converter 341 is configured to demodulate the multiple tones into multiple parallel IFFT symbols, FFT module 343 is configured to perform FFT to generate multiple parallel BPSK symbols, BPSK module 345 is configured to convert the BPSK symbols into code symbols or encoded interleaved bit stream of the access code, de-interleaver 347 is configured to de-interleave the code symbols, and decoding module 349 is configured to recover the access code from the encoded code symbols. More particularly, the down converter 341 may demodulate the multiple tones into IFFT symbols, a S/P may convert the IFFT symbols from serial to parallel, FFT module 343 may perform FFT to generate multiple parallel BPSK symbols, BPSK module 345 may convert the BPSK symbols into multiple parallel code symbols, de-interleaver 347 may de-interleave the code symbols into encoded bit stream, and a P/S may convert the code symbols from parallel to serial to be decoded by decoding module 349. Alternatively, the multiple tones may be converted from serial to parallel, 1-1-1 processed into multiple parallel BPSK symbols, converted from parallel to serial, and BPSK processed for de-interleaving. Still alternatively, the multiple tones may be converted from parallel to serial, FFT processed into multiple parallel BPSK symbols, BPSK processed into multiple parallel code symbols, converted from parallel to serial, and de-interleaved.

As in converters 230 and 340, a more typical token and verifier device may have additional components. In some embodiments, token 200 may also comprise an amplifier 260 configured to amplify the multiple tones from converter 230, and an activator or actuator 270 configured to receive a signal from a user that activates the authentication procedure. Actuator 260 may be, but is not limited to, a switch, a push-button switch, a toggle switch or a dial or sound activated device.

Token 200 may further comprise a clock module 250 configured to generate a time element. In such cases, processor 220 may be configured to generate an access code using the cryptographic key and the time element. Similarly, verifier device 300 may also comprise a clock module 350 configured to generate the time element. In such cases, processor 320 may be configured to generate an access code using the cryptographic key and the time element.

In token 200 and verifier device 300, clock modules 250 and 350 are synchronized to generate a time element periodically, for example every minute, hour, day or other selected increment as needed. This type of authentication is typically referred to as a session based authentication since the access code changes with each period of time. Also, storage mediums 210 and 310 may be databases of cryptographic keys corresponding to different users of a network, system or application. Therefore, user information is sent to verifier device 300, as discussed above, such that the appropriate cryptographic key is used at verifier 300 in the authentication procedure.

Figure 4:
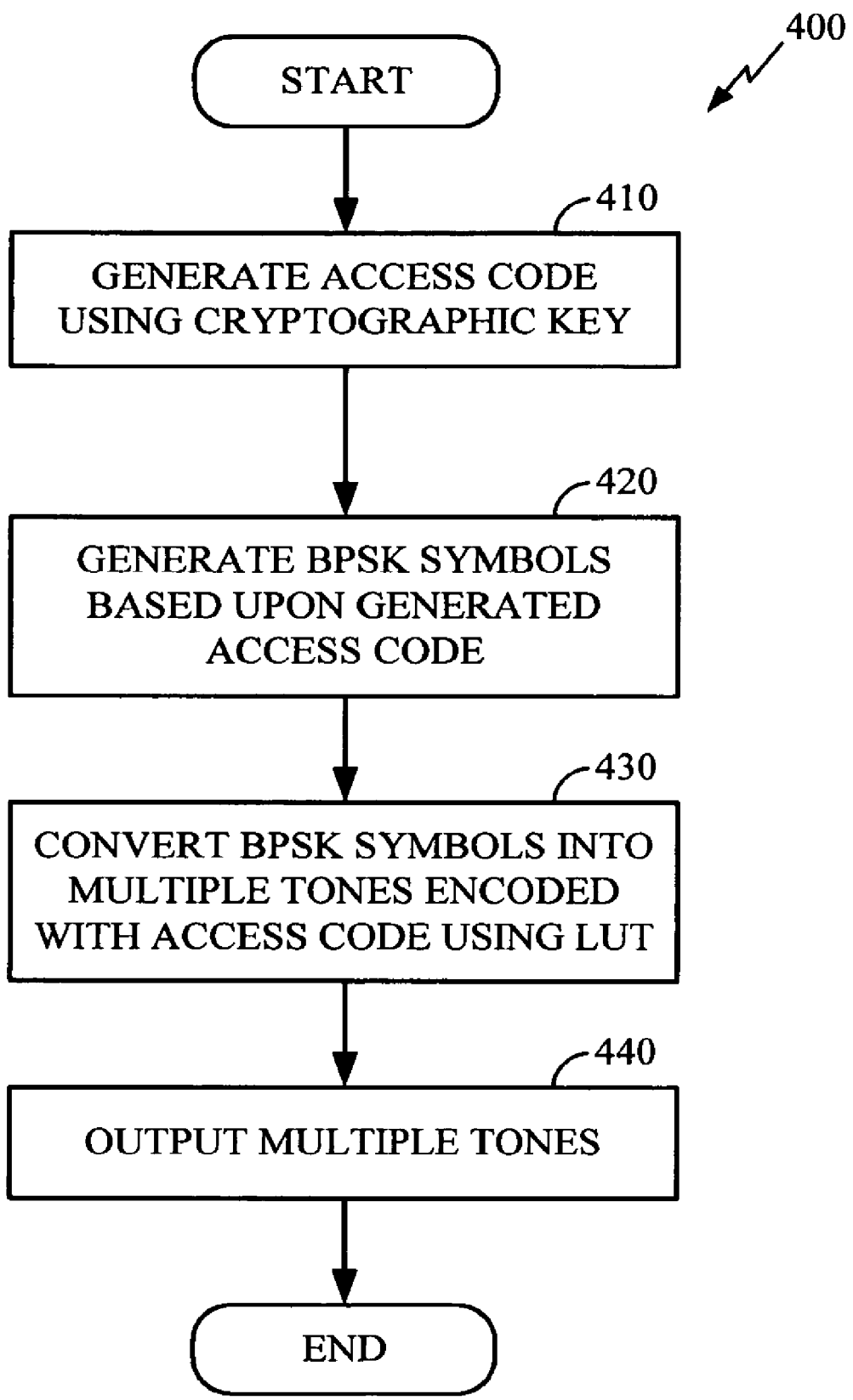
FIG. 4 shows an example method for digital authentication using an acoustic channel.

FIG. 4 shows an example method 400 for transmitting an access code using an acoustic channel. For access to a secure network, system or application, an access code is generated (410) by processor 220 using a cryptographic key. Thereafter, multiple parallel BPSK symbols are generated (420) based upon the access code, and the BPSK symbols are converted (430) into multiple tones encoded with the access code using the LUT. More particularly, the bit stream of the access code is encoded into encoded bit stream. The encoded bit stream may be converted from serial to parallel, interleaved into multiple parallel code symbols, BPSK mapped into multiple parallel BPSK symbols, and converted into multiple tones using the LUT. Alternatively, the encoded bit stream may be interleaved, BPSK mapped and then converted from serial to parallel into multiple parallel BPSK symbols for conversion into multiple tones. Still alternatively, the encoded bit stream may be interleaved, and then converted from serial to parallel into multiple parallel code symbols for BPSK processing. Here, the cryptographic key and the LUT may be stored in storage medium 210, and processor 238 may convert the BPSK symbols into the multiple tones using the LUT stored in storage medium 210. The multiple tones encoded with the access code is then output (440) for authentication.

More particularly, the LUT is pre-calculated to map the BPSK symbols into designated tones. For example, each particular sequences of BPSK symbols may be mapped and may correspond to one of various available tones. Therefore, rather than performing IFFT on BPSK symbols and modulating the IFFT symbols, the LUT converts the BPSK symbols directly into multiple tones.

In some embodiment, to enhance recovery of an access code, the BPSK symbols are repeated a selected number of times before converting the BPSK symbols. The LUT may then be pre-calculated to map sets of BPSK symbols into multiple tones. FIG. 5A to 5C shows an example of a conversion from repeated BPSK symbols into corresponding tones. Assuming a sequence of BPSK symbols {01110010} shown in FIG. 5A, a set of two BPSK symbols {01, 11, 00, 10} are repeated twice into repeated BPSK symbols {0101, 1111, 0000, 1010} as shown in FIG. 5B. The repeated BPSK symbols can then be found in the LUT for conversion into corresponding tones. FIG. 5C shows an example LUT that may be used for converting the twice repeated sets of two BPSK symbols. Here, each one of the LUT entries 0000-11111 correspond to one of tones T1-T16. Based on the LUT, the repeated BPSK symbols would correspond to tones {T6, T16, T1, T11}.

It should be noted that, the BPSK symbols shown in FIG. 5A would correspond to tones {T8, T3} if BPSK symbols are not repeated. Also, if repeated, the BPSK symbols may be repeated more than twice. Moreover, more than two BPSK symbols may be grouped into a set of BPSK symbols and the sets of BPSK symbols may be repeated a selected number of times for conversion into multiple tones. Depending on the number of BPSK symbols grouped in a set and the number of times the set is repeated, the LUT may also be adjusted. For example, a set of three BPSK symbols may be repeated three times. In such case, the LUT may have 512 entries ranging from 000000000-111111111. Thereafter, the repeated sets of three BPSK symbols may be converted into tones using the LUT.

To further enhance recovery of an access code, reference tones with reference phases may be added to the multiple tones. The reference tones are then output with the multiple tones. Also, the multiple tones may be amplified before outputting the multiple tones. In addition, if a clock module is implemented, the access code is generated by processor 220 using the cryptographic key and a time element. The access code may then be generated, converted and output from token 200 when a user inputs a command through actuator 270.

Figure 6:
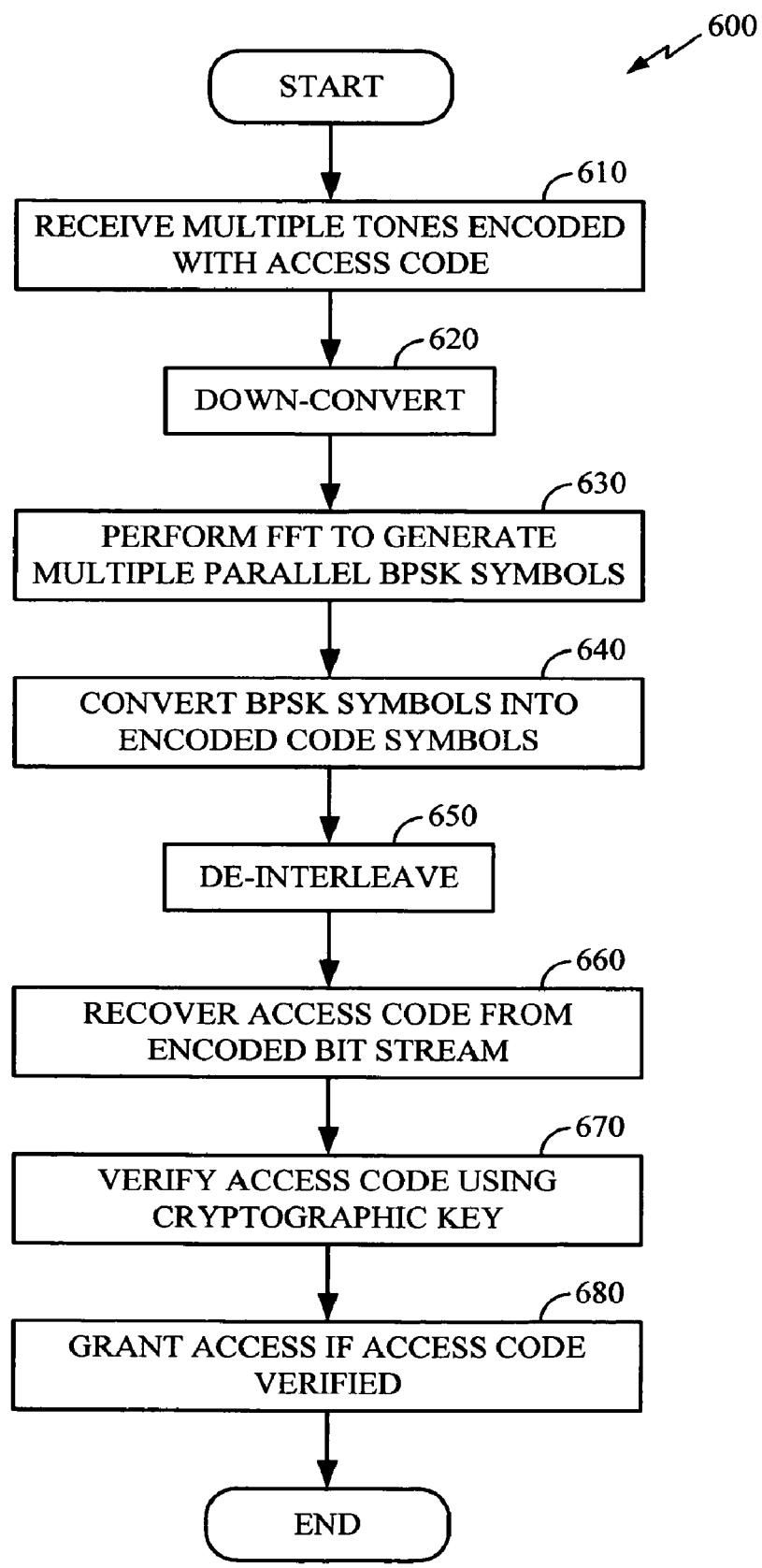
FIG. 6 shows an example method for digital verification using an acoustic channel.

FIG. 6 shows an example method 600 for verifying an access code using an acoustic channel. For verification, multiple tones encoded with an access code is received (610) through audio input module 330. The multiple tones are down-converted or demodulated (620) by down-converter 341 into multiple parallel IFFT symbols. FTT is then performed (630) by FFT module 343 to generate multiple parallel BPSK symbols. The BPSK symbols are converted (640) by BPSK module 345 into encoded interleaved bit stream or code symbols and de-interleaved (650) by de-interleaver 347. More particularly, the multiple tones may be demodulated and converted from serial to parallel into multiple parallel IFFT symbols, FFT processed into multiple parallel BPSK symbols, BPSK mapped into multiple parallel code symbols, and de-interleaved into encoded code symbols. Alternatively, the multiple tones may be demodulated, converted from serial to parallel, IFFT processed, and then converted from parallel to serial into BPSK symbols for de-interleaving. Still alternatively, the multiple tones may be demodulated, converted from serial to parallel, FFT processed, BPSK mapped, and then converted from parallel to serial into multiple parallel BPSK symbols for de-interleaving. Thereafter, the access code is recovered (660) by decoding module 349 from the encoded code symbols. The access code is then verified (670) by processor 320 using the cryptographic key and access is granted (680) if the access code is verified. Here, the cryptographic key may be stored in storage medium 310.

In method 600, if the BPSK symbols are repeated for conversion, the multiple tones are demodulated and FFT processed into repeated BPSK symbols. A selected set of BPSK symbols is then generated from the repeated BPSK symbols and the selected set of BPSK symbols are converted into the code symbols or encoded interleaved bit stream. Here, BPSK module 345 may generate the selected set of BPSK symbols from the repeated BPSK symbols and convert the selected set into code symbols. FIG. 7A to 7D shows an example generation of the selected set of BPSK symbols.

As shown, a set of two BPSK symbols are repeated twice into original BPSK symbols of $A_1B_1A_2B_2C_1D_1C_2B_2$ and demodulated into $A'_1B'_1A'_2B'_2C'_1D'_1C'_2B'_2$. The selected BPSK symbols can be generated by selecting one of the two set the repeated BPSK symbol as shown in FIG. 7C. Alternatively, the selected BPSK symbols can be generated by selecting each BPSK symbol from any one of the repeated sets of BPSK symbols as shown in FIG. 7D. It should be noted here that the multiple tones may be converted into sets of more than two BPSK symbols. For example, the multiple tones may be converted into repeated sets of three BPSK symbols. In such case, the selected set of BPSK symbols may be generated by selecting one of each BPSK symbols from the repeated sets of three BPSK symbols. Alternatively, the selected set of BPSK symbols may be generated by selected one of the repeated sets of three BPSK symbols.

Moreover, if reference tones with reference phases are received, the multiple tones are converted into BPSK symbols using the reference tones. Also, if a clock module is implemented, the access code is verified by processor 320 using the cryptographic key and a time element.

Figure 8:
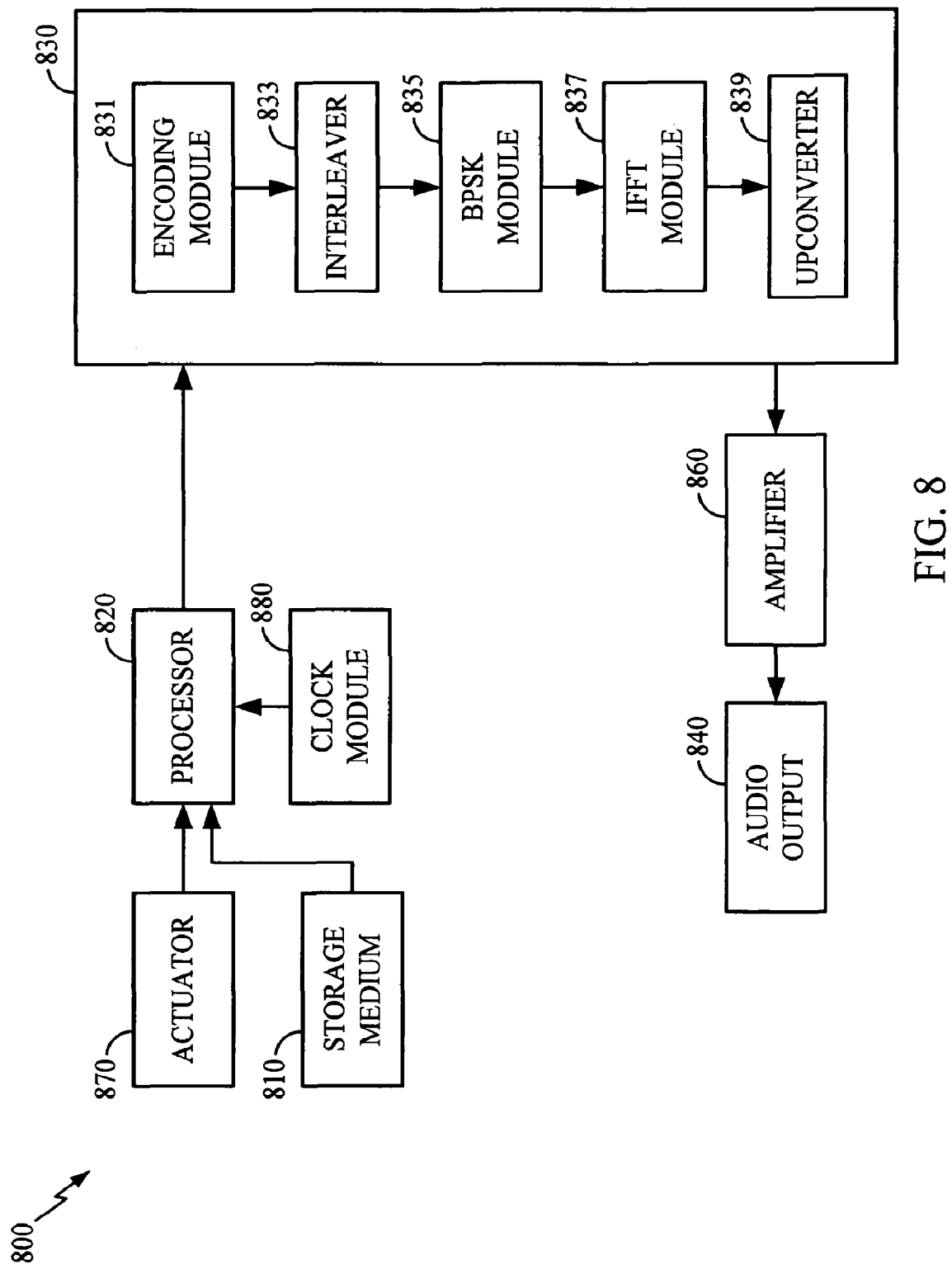
FIG. 8 shows another example embodiment of a token.

In tokens with limited processing power or speed, the LUT may significantly improve the efficiency and performance transmitting an access code using multiple tones. However, some embodiments may not implement and use a LUT. FIG. 8 shows another example embodiment of a token 800 that does not use LUT.

Token 800 comprises a storage medium 810 configured to store a cryptographic key, a processor 820 configured to generate an access code using the cryptographic key, a converter 830 configured to convert the access code into multiple tones, and an audio output unit 840 configured to output the multiple tones encoded with the access code for verification. In some embodiments, token 800 may comprise an amplifier 860, an activator or actuator 870, and a clock module 880 as implemented by amplifier 260, actuator 270 and clock module 280 of token 200.

Generally, token 800 implements the same elements as the elements in token 200. However, the modulation by converter 830 is not based on a LUT. Accordingly, it would not be necessary to store a LUT in storage mediums 810. Also, the process of converters 830 is based on the use of repeated BPSK symbols. More particularly, converter 830 of token 800 may comprise an encoding module 831 configured to encode bit stream of the access code, an interleaver 833 configured to interleave the encoded bit stream, a BPSK module 835 configured to convert the interleaved bit stream or code symbols into BPSK symbols and to generate a selected number of repeated sets of BPSK symbols, IFFT module 837 configured to perform IFFT on the repeated BPSK symbols and an up-converter 839 configured to modulate the IFFT symbols into multiple tones encoded with the access code.

Accordingly, the encoded bit stream are converted from serial to parallel and mapped into multiple parallel BPSK symbols. A selected number of repeated sets of BPSK symbols are generated from the each parallel BPSK symbols. Namely, multiple parallel repeated sets of BPSK symbols are generated and correspond to the multiple parallel BPSK symbols. The multiple repeated sets of BPSK symbols may then be IFFT processed and converted from parallel to serial for output. Here, the code symbols may be mapped into BPSK symbols and then converted from serial to parallel BPSK symbols, or the code symbols may be converted from serial to parallel and then mapped into BPSK symbols.

Figure 9:
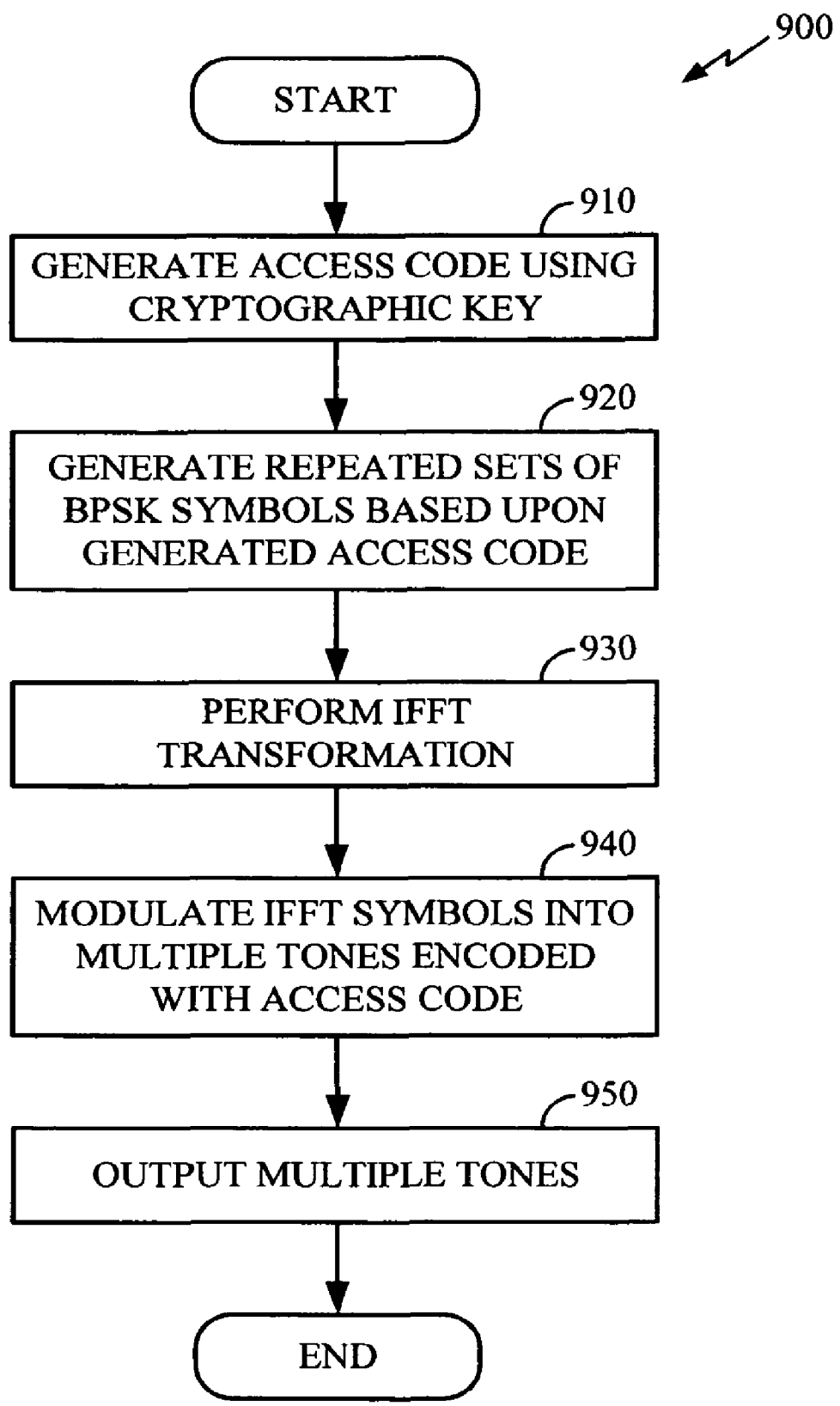
FIG. 9 shows another example method for digital authentication using an acoustic channel.

FIG. 9 shows an example method 900 corresponding to token 800 for transmitting an access code using an acoustic channel. For access to a secure network, system or application, an access code is generated (910) by processor 820 using a cryptographic key. Thereafter, multiple parallel repeated sets of BPSK symbols are generated (920) based upon the access code and IFFT transform is performed (930) to generate IFFT symbols. The IFFT symbols are modulated (940) then into multiple tones encoded with the access code and the multiple tones may be output (980) by audio output unit 840 for authentication. Here, the cryptographic key may be stored in storage medium 810.

More particularly, the bit stream of the access code may be encoded, converted from serial to parallel, interleaved, and BPSK mapped into multiple parallel BPSK symbols. The BPSK symbols of each parallel BPSK symbols are repeated a selected number of times as described with reference to FIGS. 5A to 5C, thereby generating multiple parallel repeated set of BPSK symbols for IFFT processing. Alternatively, the encoded bit stream may be interleaved, BPSK mapped and then converted from serial to parallel into multiple parallel BPSK symbols for repeating. Still alternatively, the encoded bit stream may be interleaved, and then converted from serial to parallel into multiple parallel code symbols for BPSK processing.

Furthermore, as in token 200, reference tones with reference phases may be added to the multiple tones and the reference tones may be output with the multiple tones. Also, the multiple tones may be amplified before outputting the multiple tones. In addition, if a clock module is implemented, the access code is generated by processor 820 using the cryptographic key and a time element. The access code may then be generated, converted and output from token 800 when a user inputs a command through actuator 870.

While the modulation by converter 830 is not based on the use of a LUT, the demodulation may be performed by verifier device 300 and corresponding method 600 as described with reference to FIGS. 3 and 6. Accordingly, converter 340 corresponding with converter 830 may comprise down converter 341 configured to demodulate the multiple tones into IFFT, FFT module 343 configured to perform FFT to generate repeated BPSK symbols, BPSK module 345 configured to generate a selected set of BPSK symbols from the repeated BPSK symbols and to convert the selected set of BPSK symbols into code symbols or encoded interleaved bit stream of the access code, de-interleaver 347 configured to de-interleave the code symbols, and a decoding module 349 configured to recover the access code from the encoded de-interleaved bit stream. As in token 200, modulation techniques other than BPSK may also be implemented in converters 830 and 340.

Figure 10:
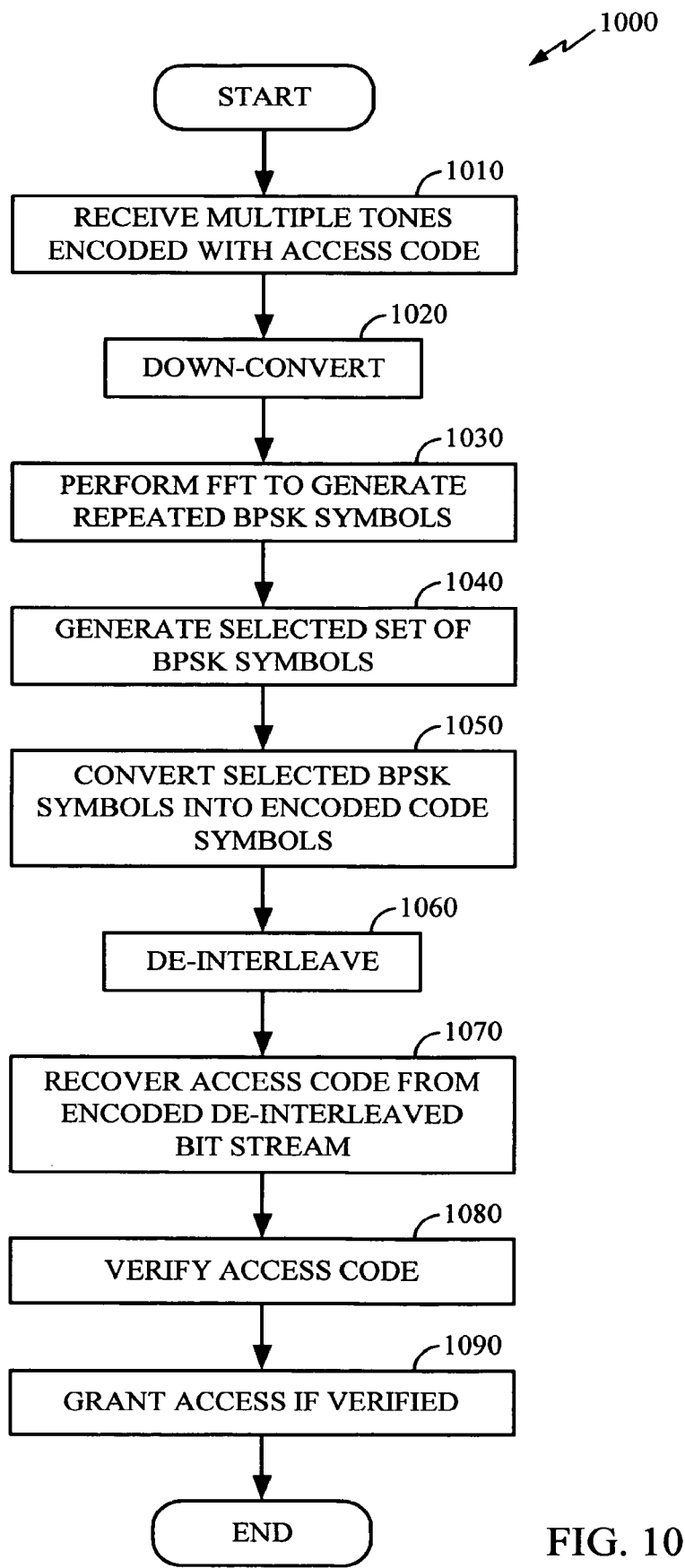
FIG. 10 shows another example method for digital verification using an acoustic channel.

FIG. 10 shows an example method 1000 corresponding to converter 830 for verifying an access code using an acoustic channel. For verification, multiple tones encoded with an access code is received (1010) through audio input module 330. The multiple tones are down-converted or demodulated (1020) by down-converter 341 into IFFT symbols. FTT is then performed (1030) by FTT module 343 to generate repeated BPSK symbols and a selected set of BPSK symbols are generated (1040) from the repeated BPSK symbols. Here, the selected set of BPSK symbols may be generated as described with reference to FIGS. 7A to 7D. The selected BPSK symbols are converted (1050) by BPSK module 345 into encoded interleaved bit stream or code symbols of the access code. Thereafter, the encoded interleaved bit stream is de-interleaved (1060) by de-interleaver 347 and the access code is recovered (1070) by decoding module 949 from the encoded de-interleaved bit stream. The access code is then verified (1080) by processor 320 using the cryptographic key stored in storage medium 910 and access is granted (1090) if the access code is verified.

As in verifier device 300, if reference tones with reference phases are received, the multiple tones are converted into IFFT symbols using the reference tones. Also, if a clock module is implemented, the access code is verified by processor 320 using the cryptographic key and a time element.

As described above, an access code and/or password may be encoded into multiple tones, transmitted through a public communication infrastructure such as Internet 120, recovered from multiple tones, and verified to access a secure network, system and/or application.

Figure 11A:
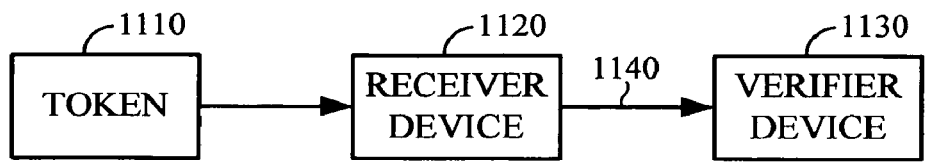
FIG. 11A to 11D show other example systems for digital authentication over an acoustic channel.
Figure 11B:
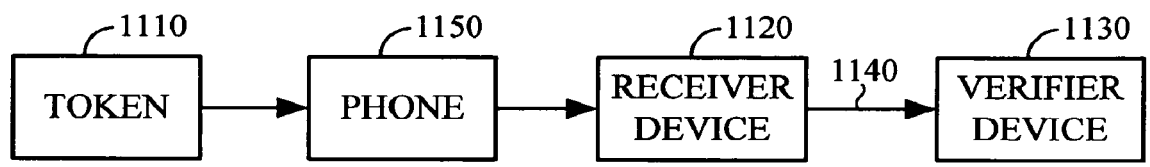
Figure 11C:
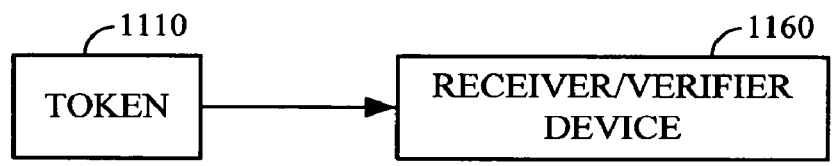
Figure 11D:
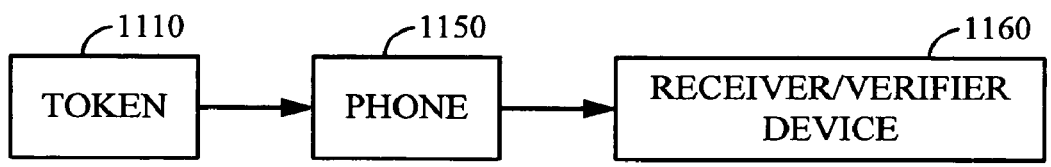

While system 100 show one example, there may be other systems for digital authentication over an acoustic channel. FIGS. 11A to 11D show some additional example systems for digital authentication over an acoustic channel. In FIG. 11A, multiple tones encoded with an access code may be output and transmitted from a token 1110 to a receiver device 1120. The access code is then forwarded from receiver device 1120 to a verifier device 1130 through a wireless or non-wireless communication infrastructure 1140. In FIG. 11B, the multiple tones encoded with an access code is output and transmitted from token 1110 to receiver device 1120 through a wireless or non-wireless phone 1150. Thereafter, the access code is forwarded from receiver device 1120 to a verifier device 1130 through a wireless or non-wireless communication infrastructure 1140. In FIGS. 11A and 11B, receiver device 1120 is implemented remotely from verifier device 1130. In such cases, receiver device 1120 may be implemented non-remotely or as part of verifier device 1130 as shown in FIG. 11C. In FIG. 11C, token 1110 outputs the multiple tones encoded with the access code directly to a receiver/verifier device 1160. Alternatively, the multiple tones encoded with the access code may be output and transmitted from token 1110 to receiver/verifier 1160 through a wireless or non-wireless phone 1150.

Figure 12:
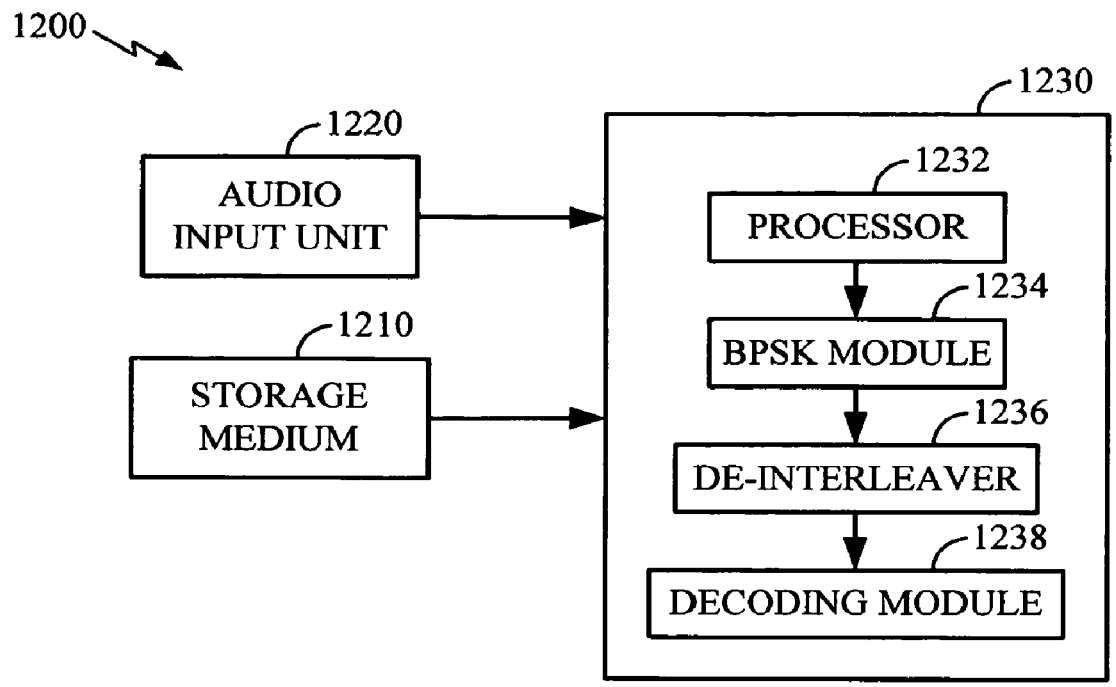
FIG. 12 shows an example embodiment of a receiver.
Figure 13:
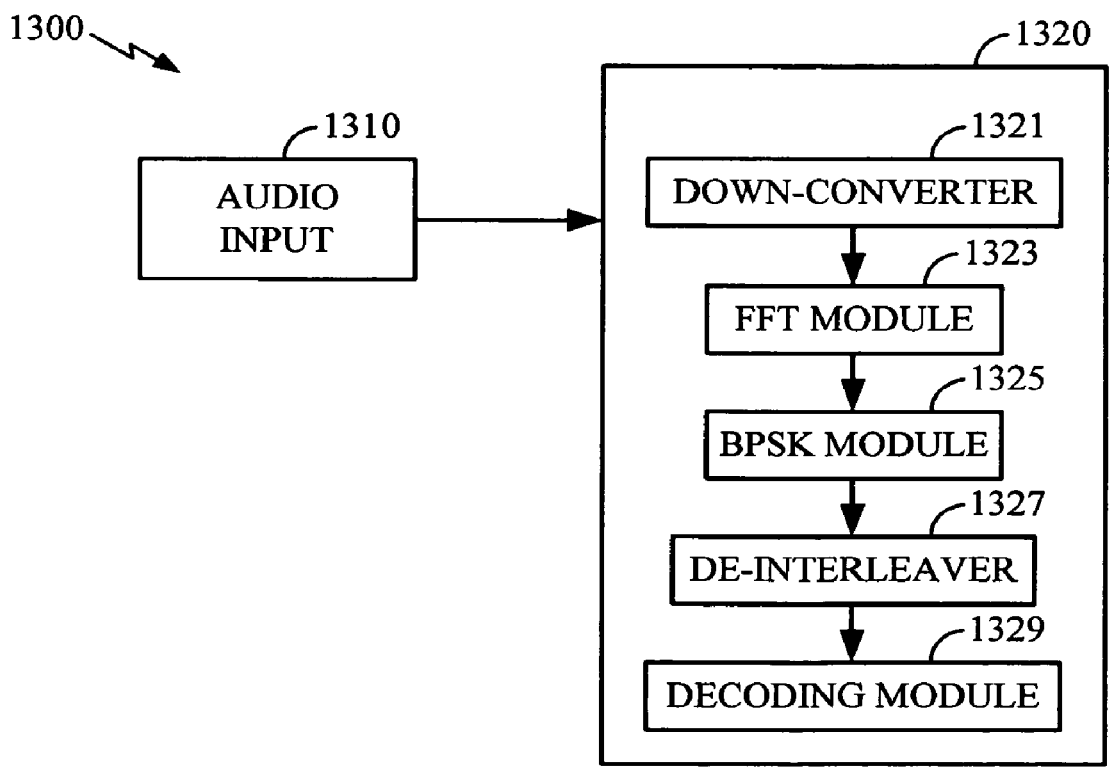
FIG. 13 shows an another embodiment of a receiver.

The multiple tones encoded with the access code may thus be forwarded from receiver device 1120 to verifier device 1130, and verifier device 1130 may recover the access code. In some embodiments, the access code may be first be recovered from the multiple tones and then the recovered access code may be forwarded from receiver device 1120 to verifier device 1130 for authentication. FIG. 12 shows one example of a receiver 1200 corresponding to token 200 and FIG. 13 shows another example of a receiver 1300 corresponding to token 800, for recovering an access code.

Receiver 1200 comprises a storage medium 1210 configured to store a LUT corresponding to the LUT in storage medium 210, an audio input unit 1220 configured to receive multiple tones encoded with an access code from a user of a token, and a converter 1230 configured to recover the access code from the multiple tones using the LUT. Converter 1230 may comprise a processor 1232 configured to convert the multiple tones into BPSK symbols using the LUT, a BPSK module 1234 is configured to perform demodulation based on BPSK to convert the BPSK symbols into code symbols or encoded interleaved bit stream of the access code, a de-interleaver 1236 is configured to de-interleave the code symbols, and a decoding module 1238 is configured to recover the access code from the encoded code symbols.

Receiver 1300 comprises an audio input unit configured to receive sound waves encoded with an access code from a user of a token, and a converter 1320. Converter 1320 may comprise a down converter 1321 configured to demodulate the multiple tones into IFFT symbols, a FFT module 1323 configured to perform FFT to generate repeated BPSK symbols, a BPSK module 1325 configured to generate a selected set of BPSK symbols from the repeated BPSK symbols and to convert the selected set of BPSK symbols into encoded interleaved bit stream of the access code, a de-interleaver 1327 configured to de-interleave the encoded interleaved bit stream, and a decoding module 1329 configured to recover the access code from the encoded de-interleaved bit stream.

Generally, a method corresponding to receiver 1200 for recovering an access code also corresponds to the method described with reference to FIG. 6. However, verification of a recovered access code and granting access based on the access code is not performed by receiver 1200. Similarly, a method corresponding to receiver 1300 for recovering an access code also corresponds to the method described with reference to FIG. 11. However, verification of a recovered access code and granting access based on the access code is not performed by receiver 1300.

Accordingly, an access code and/or password may be encoded into and recovered from multiple tones. By using the acoustic channel to input an access code for authentication, there is no need for a display or a constant computation needed for displaying an access code, thereby elongating the battery life of a token. Moreover, since the access code is not manually entered by a user, less errors are less likely to occur, especially in a system that requires a user to input an access code more than once during each access. In addition, because a standard speaker and/or microphone may be used, the system can easily be implemented without incurring significant cost.

Finally, embodiments maybe implemented by hardware, software, firmware, middleware, microcode, or any combination thereof. When implemented in software, firmware, middleware or microcode, the program code or code segments to perform the necessary tasks may be stored in a machine readable medium such as storage medium 210, 310, 810, 1210 or a separate storage medium (not shown). A processor such as processor 220, 230, 820 or a separate processor (not shown) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, it should be apparent to those skilled in the art that the elements of tokens 200 and 800 may be rearranged without affecting the operation of the token. Similarly, the elements of verifier device 300 and/or receivers 1200, 1300 may be rearranged without affecting the operations thereof. In addition, elements of tokens 200, 800; verifier device 300; and/or receivers 1200, 1300 may be implemented together. For example, processor 238 may be implemented together with processor 220 and processor 348 may be implemented together with processor 320.

Figure 14A:
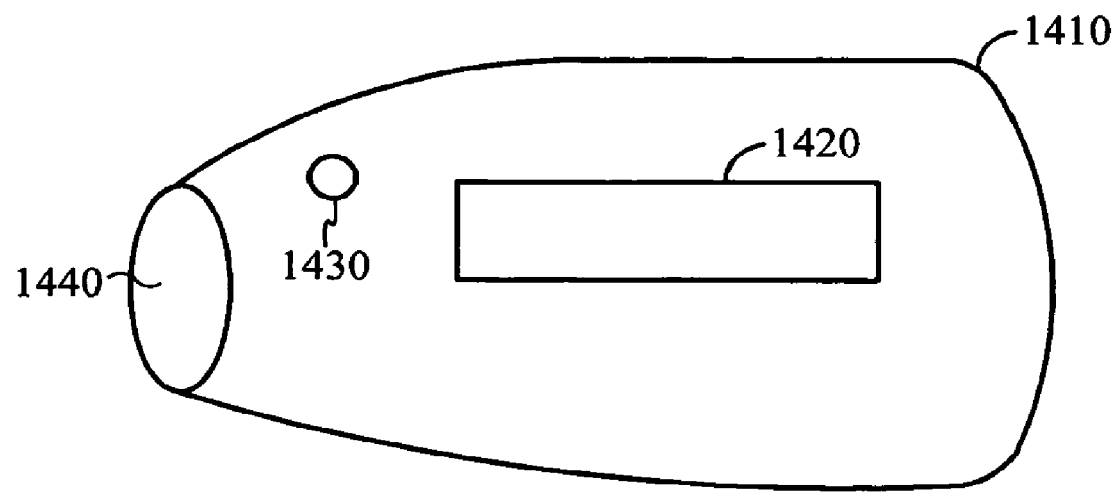
FIGS. 14A and 14B show example housings for a token.
Figure 14B:
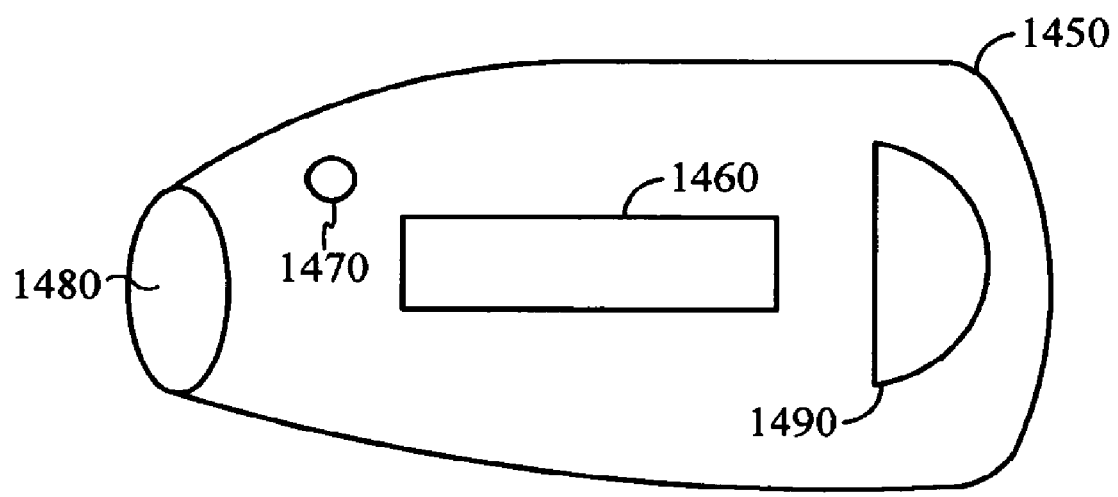

Moreover, in some embodiments, a token may be implemented with a display. FIG. 14A shows an example embodiment of a token having a housing element 1410 implemented with a display 1420, actuator 1430 and audio output unit 1440. FIG. 14B shows another example embodiment of a token having a housing element 1450 implemented with a display 1460, an actuator 1470, an audio output unit 1480 and an opening 1480 through housing element 1450. Therefore, the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

The invention claimed is:

1. A non-transitory machine readable medium having one or more instructions that, in response to execution, cause a computing device to perform operations, comprising:
storing a cryptographic key and a look up table (LUT);
generating an access code using the cryptographic key;
generating multiple parallel binary phase shift keying (BPSK) symbols based on the access code;
converting the multiple parallel BPSK symbols into multiple tones encoded with the access code using the LUT;
outputting the multiple tones;
receiving a personal identification number (PIN);
creating other multiple tones based on the PIN; and
outputting the other multiple tones.

2. The non-transitory machine-readable medium of claim 1, the operations further comprising:
repeating the multiple parallel BPSK symbols a selected number of times before the converting the multiple parallel BPSK symbols.

3. The non-transitory machine-readable medium of claim 2, wherein the repeating the multiple parallel BPSK symbols comprises repeating a set of three BPSK symbols the selected number of times; and wherein the converting the multiple parallel BPSK symbols comprises converting the set of three BPSK symbols into the multiple tones using the LUT.

4. The non-transitory machine-readable medium of claim 1, the operations further comprising adding reference tones with reference phases to the multiple tones.

5. The non-transitory machine-readable medium of claim 1, the operations further comprising:
generating time elements,
wherein the generating the access code comprises generating the access code using the cryptographic key and a time element of the time elements.

6. The non-transitory machine-readable medium of claim 1, the operations further comprising:
receiving a user command,
wherein the generating the access code comprises generating the access code in response to receiving the user command.

7. The non-transitory machine-readable medium of claim 1, the operations further comprising:
amplifying the multiple tones before the outputting the multiple tones.

8. A non-transitory machine readable medium having one or more instructions that, in response to execution, cause a computing device to perform operations, comprising:
storing a cryptographic key;
generating an access code using the cryptographic key;
generating multiple parallel binary phase shift keying (BPSK) symbols based on the access code;
repeating the multiple parallel BPSK symbols a selected number of times to obtain repeated BPSK symbols;
performing an inverse fast fourier transform (IFFT) on the repeated BPSK symbols to generate IFFT symbols;
modulating the IFFT symbols into multiple tones encoded with the access code and a personal identification number (PIN);
outputting the multiple tones; and
in response to the outputting the multiple tones, receiving a grant of access associated with at least one of an application, a system, or a network.

9. The non-transitory machine-readable medium of claim 8, wherein the repeating the multiple parallel BPSK symbols comprises repeating a set of three BPSK symbols the selected number of times and converting the set of three BPSK symbols into the multiple tones using a look up table (LUT).

10. A non-transitory machine readable medium having one or more instructions that, in response to execution, cause a computing device to perform operations, comprising:
receiving multiple tones encoded with an access code and a personal identification number (PIN);
generating multiple parallel binary phase shift keying (BPSK) symbols from the multiple tones;
converting the multiple parallel BPSK symbols into an encoded interleaved bit stream;
de-interleaving the encoded interleaved bit stream to obtain a de-interleaved bit stream;
recovering the access code and the PIN from the de-interleaved bit stream; and
in response to verifying the access code and the PIN, granting access to at least one of an application, a system, or a network.

11. The non-transitory machine-readable medium of claim 10, the operations further comprising:
generating repeated BPSK symbols based on the multiple tones;
generating a selected set of BPSK symbols from the repeated BPSK symbols; and
converting the selected set of BPSK symbols into the encoded interleaved bit stream.

12. The non-transitory machine-readable medium of claim 11, the operations further comprising:
converting inverse fast fourier transform (IFFT) symbols into repeated sets of three BPSK symbols, wherein the generating the selected set of BPSK symbols further comprises selecting three BPSK symbols from the repeated sets of three BPSK symbols.

13. The non-transitory machine-readable medium of claim 11, the operations further comprising:
converting inverse fast fourier transform (IFFT) symbols into repeated sets of three BPSK symbols, wherein the generating the selected set of BPSK symbols further comprises selecting one of the repeated sets of three BPSK symbols.

14. The non-transitory machine-readable medium of claim 10, the operations further:
storing a cryptographic key, wherein the verifying the access code further includes verifying the access code using the cryptographic key.

15. The non-transitory machine-readable medium of claim 10, the operations further comprising:
generating a time element, wherein the verifying the access code comprises verifying the access code using the time element.

16. An apparatus, comprising:
an audio input unit configured to receive multiple tones encoded with an access code and a personal identification number (PIN);
a binary phase shift keying (BPSK) module configured to generate multiple parallel BPSK symbols from the multiple tones and convert the multiple parallel BPSK symbols into an encoded interleaved bit stream;
a de-interleaving component configured to de-interleave the encoded interleaved bit stream to obtain a de-interleaved bit stream;
a decoding module configured to recover the access code and the PIN from the deinterleaved bit stream; and
a processing module configured to, in response to the access code and the PIN being verified, grant access to at least one of an application, a system, or a network.

17. An apparatus, comprising:
means for storing a cryptographic key;
means for generating an access code using the cryptographic key;
means for generating multiple parallel binary phase shift keying (BPSK) symbols based on the access code;
means for repeating the multiple parallel BPSK symbols a selected number of times to obtain repeated BPSK symbols;
means for performing an inverse fast fourier transform (IFFT) on the repeated BPSK symbols to generate IFFT symbols;
means for modulating the IFFT symbols into multiple tones encoded with the access code and a personal identification number (PIN);
means for outputting the multiple tones; and
means for receiving a grant of access associated with at least one of an application, a system, or a network based on the multiple tones.

18. A method, comprising:
storing a cryptographic key and a look up table (LUT);
generating an access code using the cryptographic key;
generating multiple parallel binary phase shift keying (BPSK) symbols based on the access code;
converting the multiple parallel BPSK symbols into multiple tones encoded with the access code using the LUT;
outputting the multiple tones;
receiving a personal identification number (PIN);
creating other multiple tones based on the PIN; and
outputting the other multiple tones.

* * * * *